United States Patent
Goel

(10) Patent No.: US 9,936,213 B2
(45) Date of Patent: Apr. 3, 2018

(54) PARALLEL DECODE OF A PROGRESSIVE JPEG BITSTREAM

(71) Applicant: ENTROPIC COMMUNICATIONS, LLC, Carlsbad, CA (US)

(72) Inventor: Anurag Goel, Hyderabad (IN)

(73) Assignee: Entropic Communications, LLC, Carlsbad, CA (US)

( * ) Notice: Subject to any disclaimer, the term of this patent is extended or adjusted under 35 U.S.C. 154(b) by 33 days.

(21) Appl. No.: 15/023,141

(22) PCT Filed: Sep. 19, 2013

(86) PCT No.: PCT/US2013/060523
§ 371 (c)(1),
(2) Date: Mar. 18, 2016

(87) PCT Pub. No.: WO2015/041647
PCT Pub. Date: Mar. 26, 2015

(65) Prior Publication Data
US 2016/0234521 A1    Aug. 11, 2016

(51) Int. Cl.
| | |
|---|---|
| *G06K 9/36* | (2006.01) |
| *H04N 19/44* | (2014.01) |
| *H04N 19/436* | (2014.01) |
| *H04N 19/42* | (2014.01) |
| *H04N 19/625* | (2014.01) |
| *H04N 19/70* | (2014.01) |
| *H04N 19/91* | (2014.01) |
| H04N 19/60 | (2014.01) |

(52) U.S. Cl.
CPC ............ *H04N 19/44* (2014.11); *H04N 19/42* (2014.11); *H04N 19/436* (2014.11); *H04N 19/625* (2014.11); *H04N 19/70* (2014.11); *H04N 19/91* (2014.11); *H04N 19/60* (2014.11)

(58) Field of Classification Search
CPC ........ H04N 19/44; H04N 19/70; H04N 19/91; H04N 19/625; H04N 19/42; H04N 19/436; H04N 19/40; H04N 19/521; H04N 19/82; H04N 7/50; H04N 7/26244; H04N 7/26313; H04N 7/30; H04N 7/26335; H04N 7/26271
See application file for complete search history.

(56) References Cited

U.S. PATENT DOCUMENTS 3,774,162 A * 11/1973 Flaherty .................. G06K 9/36
                                                      382/141
3,868,634 A *  2/1975 Dolch .................. G06K 7/10871
                                                      235/462.07

(Continued)

OTHER PUBLICATIONS

International Search Report corresponding to International Patent Application No. PCT/US2013/60523, dated Apr. 15, 2014.

*Primary Examiner* — Amir Alavi
(74) *Attorney, Agent, or Firm* — McAndrews, Held & Malloy, Ltd.

(57) ABSTRACT

A progressive JPEG bitstream may comprise an image component that is comprised of multiple scans of MCUs/data units that are in turn comprised of at least one MCU/data unit segment. Each MCU/data unit segment is successively scanned. The MCU/data unit segment is then reconstructed using multiple entropy decoders operating in parallel on different scans of each MCU/data unit segment.

21 Claims, 14 Drawing Sheets

(56) References Cited

U.S. PATENT DOCUMENTS

| | | | | |
|---|---|---|---|---|
| 5,227,876 | A | * | 7/1993 | Cucchi ................. H04N 19/00 |
| | | | | 348/484 |
| 5,446,497 | A | * | 8/1995 | Keating ............... H04N 7/0112 |
| | | | | 348/443 |
| 6,069,607 | A | * | 5/2000 | Everett ................. H04N 7/012 |
| | | | | 345/440.1 |
| 2002/0131084 | A1 | * | 9/2002 | Andrew ................. G06T 9/007 |
| | | | | 358/1.16 |
| 2003/0053702 | A1 | | 3/2003 | Hu |
| 2009/0010337 | A1 | | 1/2009 | Wang |
| 2010/0057413 | A1 | * | 3/2010 | Lee .................... G06F 17/5009 |
| | | | | 703/2 |
| 2011/0279294 | A1 | | 11/2011 | Sagar |
| 2012/0155767 | A1 | | 6/2012 | Zhu et al. |
| 2016/0234521 | A1 | * | 8/2016 | Goel ....................... H04N 19/44 |
| 2016/0301942 | A1 | * | 10/2016 | Qiu ...................... H04N 19/436 |

* cited by examiner

US 9,936,213 B2

PARALLEL DECODE OF A PROGRESSIVE JPEG BITSTREAM

The present application is a 371 filing of application Serial No. PCT/US2013/060523, filed on Sep. 19, 2013, and entitled "PARALLEL DECODE OF A PROGRESSIVE JPEG BITSTREAM", which is related to co-pending patent application Serial No. PCT/US2013/059899, filed Sep. 16, 2013, entitled "AN EFFICIENT PROGRESSIVE JPEG DECODE METHOD"; also related to co-pending patent application Serial No. PCT/US2013/060626, filed on Sep. 19, 2013 and entitled "A PROGRESSIVE JPEG BITSTREAM TRANSCODER AND DECODER", each of which is hereby incorporated herein by reference in their entirety.

TECHNICAL FIELD

The disclosed method and apparatus relates to communication systems, and more particularly, embodiments related to reduce the memory and computation resources required to decode an image bitstream encoded in Progressive JPEG Mode.

BACKGROUND

The Joint Picture Experts Group (JPEG) Standard suggests storing entropy decoded Discrete Cosine Transform coefficients for all the components in memory for an image bitstream encoded in progressive JPEG Mode. As soon as a subset of frequency coefficients of all the components as partitioned by an image or JPEG encoder becomes available, the same is stored and decoded and an image that is a coarse approximation of an original image is displayed. Discrete Cosine Transform (DCT) coefficients which have been decoded are stored as they are required for decoding an improved approximation of an image after a remaining portion of the bitstream has been received. As more frequency coefficients of all the components as partitioned by image/JPEG encoder become available, they are stored and decoded along with previously stored frequency coefficients and an image, which is an improvement over the previous coarse approximation of an original image, is displayed.

JPEG image decoding as described above requires an intermediate memory of the order of image_width*image_height*no_of_components*frequency_coefficient_num_bytes for storing DCT coefficients of all image components. no_of_components is the total number of different components which when combined represent a multi-component JPEG image; for example, a YUV JPEG image consists of three components Y, U and V. frequency_coefficient_num_bytes is the number of bytes required to represent a frequency coefficient. The JPEG library developed by the independent JPEG group requires so much intermediate memory for decoding a progressively encoded JPEG bitstream.

If the original image dimensions are 2K*2K, then approx 2K*2K*3*2 bytes of memory are needed for YUV 4:4:4 color format, which is approximately 24 MB. Successive improvements in an image require repeated Inverse Discrete Cosine Transform (IDCT) computation, hence increasing computation resources by a factor proportional to the number of successive improvements.

Researchers have proposed various solutions toward efficient implementation of progressive JPEG decoder.

U.S. Pat. No. 7,313,281B2, entitled "Method and Related Apparatus for JPEG Decoding" to Chi-Cheng Ju, et. al., teaches decoding each of the scans into partial decoded pixel and summing each newly generated partial decoded pixel.

U.S. Patent Application No. 2003/0091240A1, entitled "Method and Apparatus for Progressive JPEG Image Decoding" to Chi-Cheng Ju et. al., and U.S. Patent Application No. 2007/0098275A1, entitled "Method and Apparatus for Progressive JPEG Image Decoding" to Kun-Bin Lee, teach decoding a progressive JPEG image by dividing each of the scans into multiple regions and then decoding the regions individually. Finally, the decoded coefficients of the current decoding region of all scans are outputted in order to construct a portion of the image data.

U.S. Patent Application No. 2005/0008234A1, entitled "Process and Functional Unit for the Optimization of Displaying Progressively Coded Image Data" to Uwe-Erik Martin, teaches a method for optimizing the downloading of progressively coded image data. The wait times between the time points of directly consecutive decoding steps are calculated using statistical image quality parameters of received partial image data in such a manner that the decoding steps which do not lead to perceptible improvement in the quality of a reconstructed image are suppressed.

U.S. Patent Application No. 2006/0067582 A1, entitled "Progressive JPEG Decoding System" to Mi Michael Bi, et. al., teaches a method in which DCT coefficients in a particular decoded scan are classified into two categories, namely, most significant DCT coefficients and least significant DCT coefficients. The least significant DCT coefficients are not stored directly in the memory. They are binarized and represented by either "0" or "1" indicating if they are zero or non-zero coefficients. The binarized bitmap for the least significant DCT coefficients and the actual values of most significant DCT coefficients are stored in the memory and, thus, the overall memory requirements are significantly reduced.

U.S. Patent Application No. 2008/0130746A1, entitled "Decoding a Progressive JPEG Bitstream as a Sequentially Predicted Hybrid Video Bitstream" to Soroushian, et. Al, teaches generating an intermediate bitstream by parsing a JPEG bitstream carrying a picture. The intermediate bitstream generally includes one or more encoded frames each representing a portion of the picture. A second circuit may be configured to (i) generate one or more intermediate images by decoding the encoded frames, and (ii) recreate the picture using the intermediate images.

U.S. Patent Application No. 2008/0310741A1, entitled "Method for Progressive JPEG Image Decoding" to Yu-Chi Chen, et. al., describes a method of using a non-zero history table and a sign table of each Variable Length Decoding (VLD) result, which are recorded and used as a reference for decoding the next scan layer. The decoded coefficients are no longer directly stored in a memory to save the memory space.

U.S. Patent Application No. 2009/0067732A1, entitled "Sequential Decoding of Progressive coded JPEGS" to Sukesh V. Kaithakapuzha, teaches progressive scan encoded JPEGS are decoded sequentially on a Minimum Coded Unit (MCU) basis. Address Pointers are used to index into each scan, and coded data from each scan is outputted to form an entropy decoded MCU.

Each of these attempts to solve the problem addressed by this disclosure have the similar shortcoming of increased memory usage, and increased decode latency. Secondly the prior art references perform IDCT, data copy and color format conversion, such as YCbCr to RGB, for entire MCU/data unit for every reconstruction of an approximation of an image.

DISCLOSURE OF THE INVENTION

The problem solved by this disclosure is to reduce the memory and computation resources required to decode an image bitstream encoded in Progressive JPEG Mode.

For an understanding of the features in this disclosure a brief description of the state of the art is provided.

FIG. 1 shows the major operations involved in a typical prior art JPEG encoder 10. Color image is generally represented as a mixture of various color component images, for example a color image may be represented by a combination of Red, Green and Blue color component image. For higher compression and efficient implementation of various use cases a RGB source image is generally pre-processed to convert it into a YUV source image. Source Image Data which is an input to JPEG Encoder may or may not be a multiple component image, for example a YUV source image is a 3 component image. JPEG encoder 10 illustrates encoding of a single component source image. Typically similar operations as performed for encoding of a single component source image are performed by JPEG encoder 10 for encoding multiple component source image (such as shown in FIG. 1A).

Encoder 10 partitions the source image data into MCU/data unit and performs the encoding operation on each MCU/data unit. A data unit is 8×8 block of samples of one component in DCT-based processes.

FDCT block performs a mathematical transformation of data unit to convert a block of samples into a corresponding block of original DCT coefficients. One of the DCT coefficients is referred to as the DC coefficient and the rest are the AC coefficients.

JPEG Encoder 10 selects a Quantization Table selected from Table Specifications block. Quantizer block quantizes DCT coefficients by using a specific quantization value for each positional DCT coefficient. Positional quantization value is obtained from Quantization Table.

$$Iq_{uv} = \text{round}(I_{uv}/Q_{uv})$$

$Iq_{uv}$—Quantized DCT coefficient at frequency (u,v), $I_{uv}$—DCT coefficient at frequency (u,v), $Q_{uv}$—Quantization value at frequency (u,v).

After quantization, and in preparation for entropy encoding, JPEG Encoder 10 encodes the quantized DC coefficient as the difference from the DC term of the previous block in the encoding order (defined in the following), as shown in FIG. 2A.

After quantization, and in preparation for entropy encoding, the quantized AC coefficients are converted to a stream of coefficients as per the zig-zag order. The zigzag order is as specified in FIG. 2B.

Entropy Encoder block (FIG. 1) encodes the quantized DCT coefficients by performing either of the two entropy coding methods, i.e., Huffman or Arithmetic coding. Corresponding entropy encoding tables are selected from Table specifications block. Entropy Encoder block may format the encoded stream as progressive JPEG bitstream or as a sequential JPEG stream.

A progressive JPEG encoder typically stores all the quantized DCT coefficients of an image in an intermediate image buffer that exists between the Quantizer block and the Entropy Encoder block. There are two procedures, i.e. spectral selection and successive approximation, by which the quantized coefficients in the buffer may be partially encoded within a scan, the scan contains data from all the MCU's/data units.

Reference is now made to FIG. 1B. In spectral selection the zig-zag sequence of DCT coefficients is segmented into frequency bands. The same frequency bands from all the MCUs/data units are encoded sequentially to form a scan. DC coefficients are always coded separately from AC coefficients. DC coefficients scan may have interleaved blocks from more than one component. All other scans will have only one component.

Successive approximation is a progressive coding process in which the coefficients are coded with reduced precision. DCT coefficients are divided by a power of two before coding.

An encoder or decoder implementing a full progression uses spectral selection within successive approximation. As indicated above, FIG. 1B illustrates the spectral selection and successive approximation.

FIG. 3 shows the major operations involved in a JPEG decoder 14. Progressive JPEG decoder typically stores all quantized DCT coefficients of an image before decoding DCT coefficients of an image present in separate scans. As soon as a subset of DCT coefficients as partitioned by JPEG encoder becomes available, it is decoded for all image components and image is sent for display. A maximum number of times a new approximation of an image can be displayed may be equal to the minimum number of scans of an image component.

JPEG Decoder parses the compressed JPEG bitstream and determines if the JPEG bitstream to be decoded is a Progressive, Sequential, Hierarchical or lossless JPEG bitstream. Entropy Decoding, i.e., Huffman or Arithmetic Decoding, and Quantization tables to be used for decoding are obtained from the compressed bitstream.

Entropy Decoder block performs an Entropy Decoding operation on compressed bitstream using Entropy Decoding Tables specified in the bitstream. Entropy Decoding Table is obtained from the Table Specification block on the basis of information parsed from the JPEG bitstream. Typical progressive JPEG Entropy decoder entropy decodes a particular scan completely before proceeding to decode the next scan. In this manner, progressive Entropy Decoder entropy decodes all the scans, and hence entropy decodes all image components. Entropy decoder block generates quantized DCT coefficients.

An intermediate Image Buffer exists between the Quantizer block and the Entropy Decoder block. Progressive JPEG entropy decoder stores all the quantized DCT coefficients of an image in an intermediate image buffer.

Dequantizer block (FIG. 3) performs a dequantization operation using Dequantization Tables specified in the bitstream. De-Quantization Table is obtained from the Table Specification block on the basis of information parsed from the JPEG bitstream.

$$R_{uv} = Iq_{uv} * Q_{uv}$$

$R_{uv}$—Inverse Quantized DCT coefficient at frequency (u,v)

$Iq_{uv}$—Entropy decoded DCT coefficient at frequency (u,v)

$Q_{uv}$—Quantization value at frequency (u,v)

If successive approximation was used by Progressive JPEG Encoder then JPEG decoder multiplies the quantized DCT coefficients by a power of two before computing the IDCT. Power of two to be used is obtained from the encoded bitstream.

IDCT block performs an Inverse DCT operation on an 8×8 block of inverse quantized DCT coefficients to generate an 8×8 block of image samples of a particular image component.

JPEG Decoder decodes all MCUs/data units to form Reconstructed Image Data.

Decoding of a progressively encoded JPEG image usually shows successive improved approximations of an entire image, as shown in FIG. 4.

Decoding of a sequentially encoded JPEG image usually shows a row-by-row build-up of a final image, as shown in FIG. 5.

The embodiments disclosed herein can be used in conjunction with other related co-pending patent applications for efficient IDCT computation for reconstruction of approximate JPEG images, including "An Efficient Progressive JPEG Decode Method" Serial No. PCT/US2013/059899.

A system level flow of JPEG decoding in Set Top Box for one component is shown in FIG. 3A.

There are various uses which require a JPEG Decoder to be present on Set Top Box (STB), which include:
  Internet browsing on set top box;
  Decode and display of JPEG images downloaded from internet/intranet, which may be wired or wireless or a combination thereof;
  Decode and display of JPEG images shared via storage devices such as USB stick, USB hard disk, SATA hard disk, Flash, etc; and
  Decode and display of JPEG images shared over relatively close distance wired or wireless channel such as Bluetooth, WI-FI etc.

JPEG images encoded for internet/intranet/Wide Area Network (WAN)/Local Area Network (LAN) or downloaded from internet intranet/WAN/LAN may be available in JPEG progressive mode, hence it is important for Set Top Box to support decoding of progressively encoded JPEG content. STBs have a limited amount of memory, hence it is essential that a reduced memory footprint be used for decoding of Progressive JPEG images.

Computational resources are becoming economical, and relatively more computation power is available. The computation resources of higher capability have propagated into almost all strata of society of developed, developing countries and to some extent in under developed countries. Resolution supported by digital cameras has also gone up considerably. However the same is not true for the bandwidth available to the consumers, hence, progressively encoded JPEG content is likely to become, and is becoming, available on internet.

The present disclosure presents embodiment for performing parallel decoding of progressively encoded JPEG bitstreams using a reduced amount of memory. These embodiments are equally applicable for the two use cases of decoding JPEG bitstream from a file and of decoding JPEG bitstream streaming over a wired/wireless network.

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

BRIEF DESCRIPTION OF THE DRAWINGS

The features of the invention, and its technical advantages, can be seen from the following description of the preferred embodiments together with the claims and the accompanying drawings, in which:

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION OF PREFERRED EMBODIMENTS

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

Figure 1:
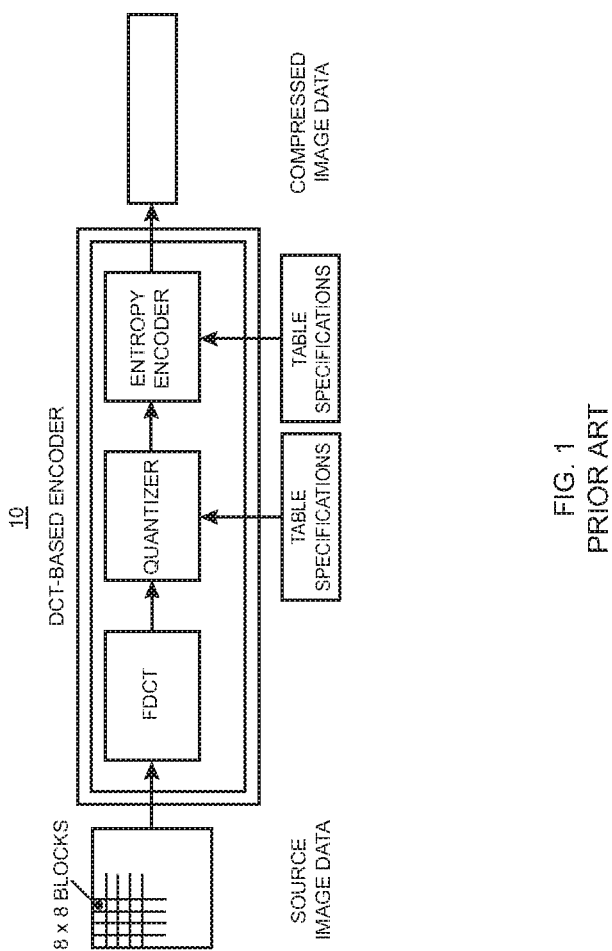
FIG. 1 shows a typical prior art JPEG encoder.
Figure 1A:
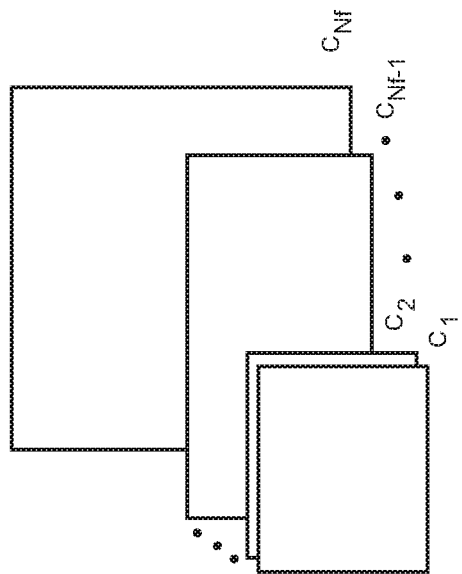
FIG. 1A shows a multi-component source image.
Figure 1B:
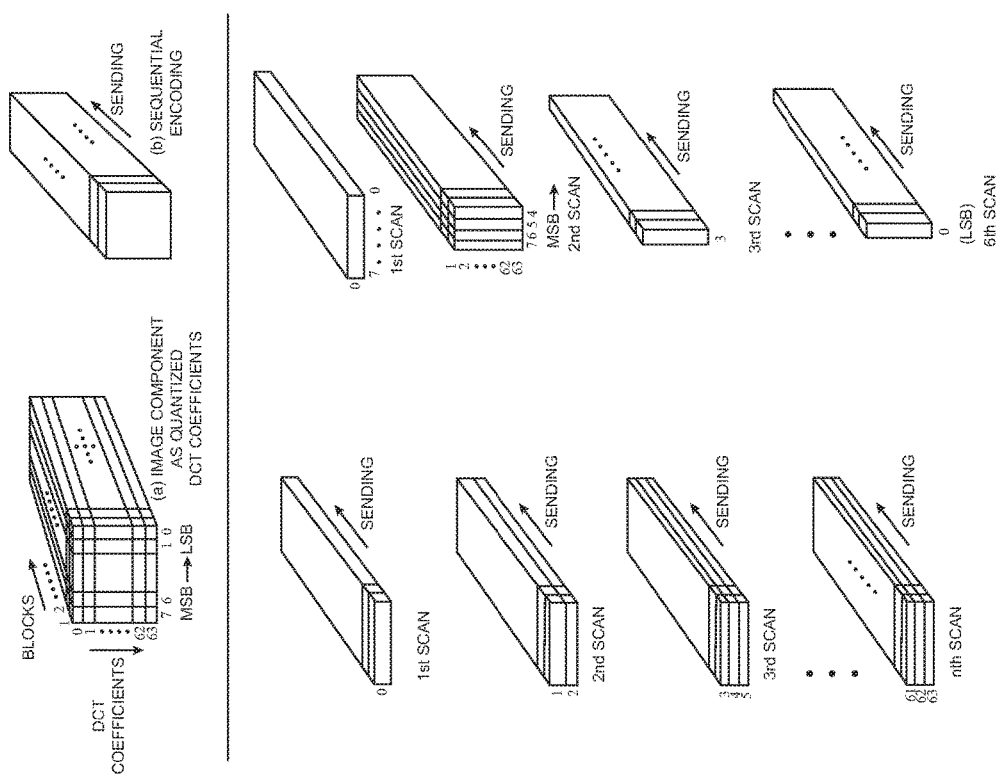
FIG. 1B illustrates progressive encoding with spectral selection shown on the left side, and successive approximation shown on the right side.
Figure 2A:
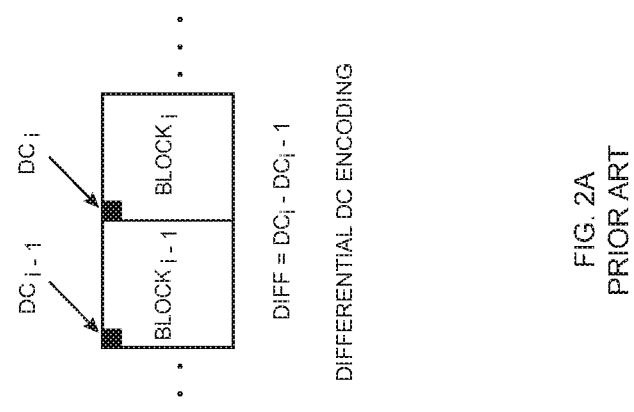
FIG. 2A shows how a prior art DC prediction is done.
Figure 2B:
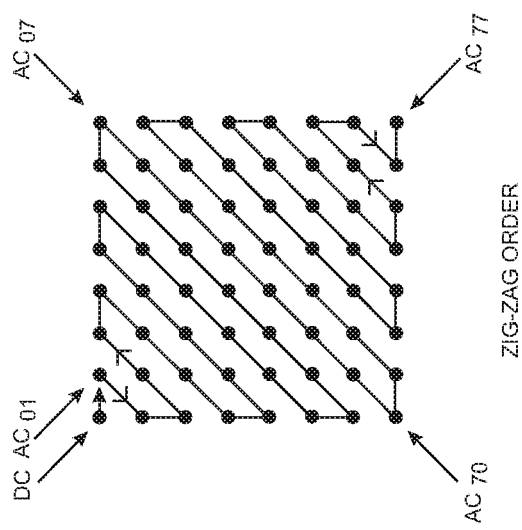
FIG. 2B shows the reordering of the DCT coefficients in a zigzag order.
Figure 3:
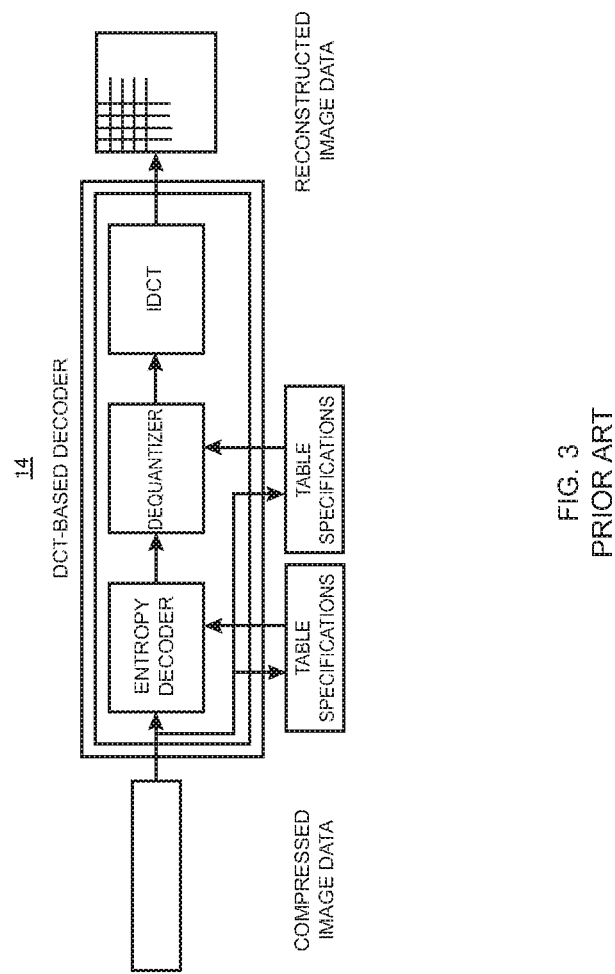
FIG. 3 shows a typical prior art JPEG decoder.
Figure 3A:
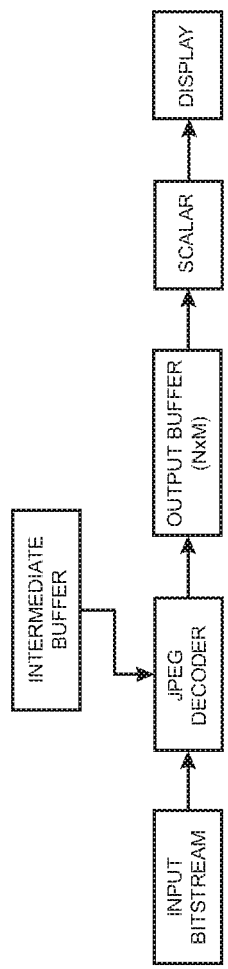
FIG. 3A illustrates system level flow of JPEG decoding in Set Top Box for one component.
Figure 4:
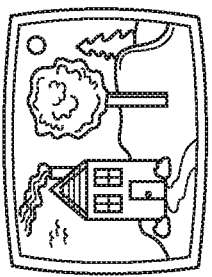
FIG. 4 depicts prior art progressive JPEG decoding.
Figure 4:
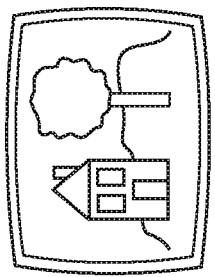
Figure 4:
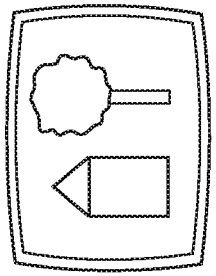
Figure 5:
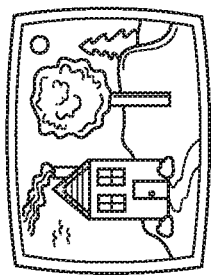
FIG. 5 depicts prior art sequential JPEG decoding.
Figure 5:
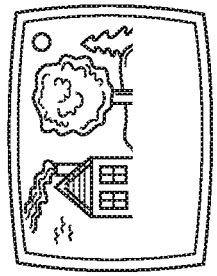
Figure 5:
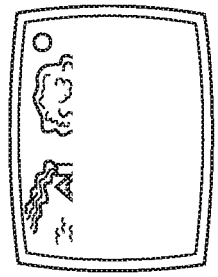
Figure 6:
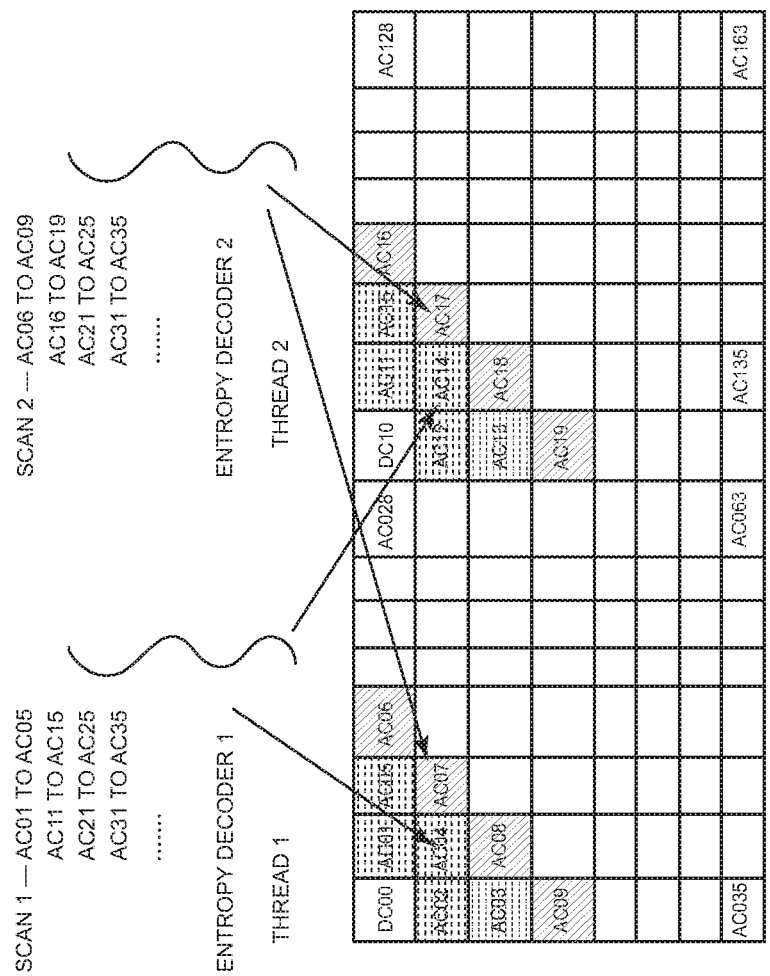
FIG. 6 exemplifies how different scans produce and populate DCT coefficients for two 8×8 blocks.

A progressively encoded JPEG bitstream is likely to contain AC frequency coefficients of each image component in multiple scans. An encoder could have partitioned frequency coefficients according to spectral selection and/or successive approximation as described in JPEG standard, as referenced. See FIG. 1B and FIG. 6.

This disclosure teaches the parallel decoding of the available portion of a progressive JPEG bitstream. Each scan of a component is scheduled to be decoded by a separate thread/process. Different scans are assigned to a different thread/process. Each thread/process processes the progressive JPEG bitstream to search for Start of Scan (SOS) Marker. A table is maintained which stores which thread/process/hardware is decoding which scan. This table is used by threads/processes to find a unique scan for each of the thread/process/hardware. Alternatively, a scan finder finds all of the scans present in a JPEG bitstream and a scan allocator preferably allocates all of the scans of a particular image component to different thread/process/hardware. Preferably, each component is decoded at one time to reduce system resources such as thread, process, and memory, etc. Alternatively, all components can be scheduled to be decoded in parallel. Each thread/process executes a software entropy decoder or controls one or more hardware entropy decoders. The decision of whether to decode compressed components one after the other or in parallel is dependent on the availability of system resources. Each thread/process can run on one or more processors; hence, decode of one or more scans can happen on one or more processors. Processor can be a VLIW Processor/Super Scalar Processor/DSP processor/General purpose processor etc. Decoding of a progressive JPEG stream is synchronized by communication of a synchronization signal. The synchronization signal may be implemented as various inter thread or process or processor or hardware communication methods. Message queues, semaphores, counting semaphores, spin-lock, mutexes or interrupts can be used as some of the inter thread or inter process or inter processor communication methods. Multiple thread/process/hardware synchronization point is set at a Data unit/MCU boundary. Synchronization point is programmable. If synchronization points are separated by a large number of Data unit/MCU then memory required to decode an Image Component will increase, and if synchronization points are separated by relatively small number of Data unit/MCU then inter thread/process/processor communication will increase. Depending on the memory and computation resources available an optimum synchronization point is chosen.

An Entropy Decoder is run on each thread/process. Entropy decoded DCT coefficients are stored in a shared buffer memory which is accessible by all threads/processes. Double buffering is used to efficiently use the computational resources as it keeps all the decoding modules busy for decoding a JPEG bitstream. When de-quantization and IDCT task gets the information, i.e. synchronization signal, that all of the Entropy decoders have reached a synchronization point, this task then schedules the entropy decoded DCT coefficients for de-quantization, Point Transform, IDCT, and other operations involved in decoding of a JPEG bitstream.

Once Data units of an Image component are reconstructed, they are then written to the output buffer. After DCT coefficients of Data units present till the synchronization point has been reconstructed, Shared buffer memory which was being used for storing DCT coefficients is released to be used by Entropy Decoders and a buffer release signal is communicated to all the Entropy Decoders. Hence, intermediate memory required to store DCT coefficients is equal to the 2*Data_Unit_Size*Decodable_Segment_Length.
Data_Unit_Size=8×8, Decodable_Segment_Length= Number of Data Units present between 2 synchronization points.

Next Decoding of next MCU/data unit segment is scheduled. This process will be repeated until all MCU/data unit segments present in a scan have been decoded.

After available scans of an image component are decoded, the process is then repeated for chosen scans from the available scans of the rest of the image components. Output of JPEG decoder may go though scaling to be coherent with the display resolution and may also go through image post processing operations for enhancement of image quality.

If a progressive JPEG bitstream is being transmitted over a relatively narrow bandwidth network then only few scans of each image component will be available to the JPEG Decoder at a given instant in time. Hence, for a streaming progressive JPEG bitstream, multiple approximations of a JPEG image will be sent to display until the complete JPEG bitstream is received by the JPEG decoder.

Parallel Decoding means that various portions of one or more data units are being entropy decoded in parallel. Parallel decoding continues until a synchronization point is reached. Once a synchronization point is reached, another buffer is ready to be used by Entropy Decoder. If the buffer is not ready Entropy decoders will wait until they receive the buffer available information.

Figure 7:
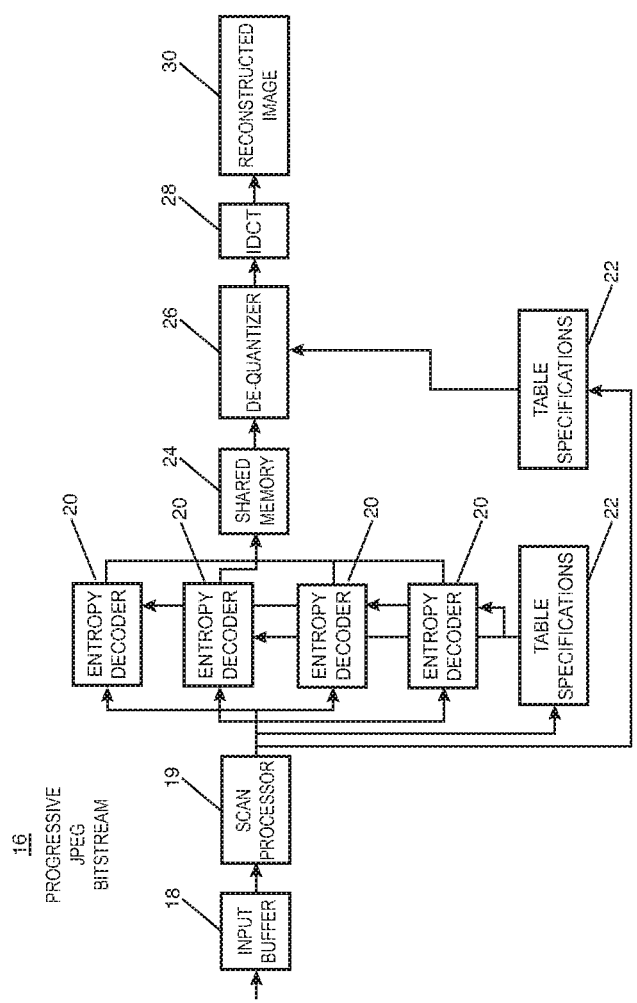
FIG. 7 shows the parallel decoding of a Progressive JPEG bitstream for more than one image component.

The present invention can either perform Individual Component decode, i.e., decode one component at a time, or simultaneous decode of all image components. For example, a first embodiment showing a simultaneous parallel decode of a Progressive JPEG bitstream 16 is shown in FIG. 7 for one or more than one image component. This embodiment performs parallel decoding of the available portion (available scans of available image components) of progressive JPEG bitstream 16. Each scan, via an input buffer 18 and scan processor 19, of a component is scheduled to be decoded, via an entropy decoder 20, by a separate thread/process/hardware pursuant to a table of specifications 22. Scan processor 19 finds all of the scans present in an available JPEG bitstream and preferably allocates all of the scans of a particular image component to different thread/process/hardware. Each thread/process can run on one or more processors or control one more hardware entropy decoders. Hence, decoding of one or more scans can occur on one or more processors or hardware entropy decoder, as shown in FIG. 7. The processor can be a VLIW Processor/Super Scalar Processor/DSP processor or a General purpose processor etc.

As indicated previously, decoding of progressive JPEG stream 16 is synchronized by communication of a synchronization signal. The synchronization signal may be implemented as various inter thread or inter process or inter processor or inter hardware communication methods. Message queues, semaphores, mutexes or interrupts can be used as some of the inter thread or process or processor communication methods.

Figure 10:
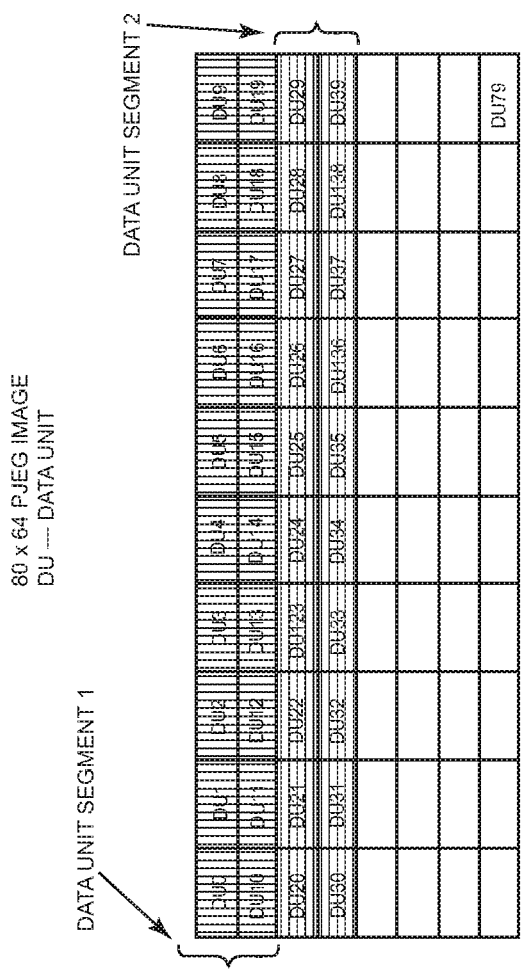
FIG. 10 shows two Data Unit Segments in an 80×64 JPEG image.

Entropy decoder 20 is run on each thread/process/hardware. Each entropy decoder 20 decodes a similar MCU/data unit segment, for example Data Unit Segment1 as shown in FIG. 10. Entropy decoded DCT coefficients are stored in a shared buffer memory 24 which is accessible by all threads/processes. Double buffering, via shared memory 24, is used to efficiently use the computational resources to keep all the decoding modules busy for decoding JPEG bitstream 16. When de-quantizer 26 and IDCT 28 tasks get the information, i.e., synchronization signal, and all entropy decoders 20 have reached a synchronization point, this task then schedules the entropy decoded DCT coefficients for de-quantizer 26, inverse point transform (not shown), IDCT 28, and other operations involved in decoding of JPEG bitstream 16. Reconstructed Data Units of an Image component are then written to the output buffer to form a reconstructed image 30.

After data units present until the synchronization point, for example 20 Data Units as shown in FIG. 10, have been reconstructed 30, shared buffer memory 24, which was being used for storing DCT coefficients, is released to be used by entropy decoders 20 and a buffer release signal is communicated to all the entropy decoders 20. Hence, the intermediate memory required to store the DCT coefficients is equal to 2*Data_Unit_Size*Decodable_Segment_Length. Data_Unit_Size=8×8, Decodable_Segment_Length= Number of Data Units present between 2 synchronization points.

Next Decoding of next MCU/data unit segment, for example Data Unit Segment2 as shown in FIG. 10, is scheduled. This process will be repeated until all MCU/data unit segments, for example DU0 to DU79 as shown in FIG. 10, present in a scan have been decoded.

All regions of a JPEG image may not be of immediate and simultaneous importance for the user. Hence, the present disclosure
1. Reconstructs certain regions of JPEG image with lower quality as compared to other regions in which relatively higher quality is maintained.
2. Skips decoding of certain regions.

Region of Interest decoding is particularly useful for reconstructing approximations of a JPEG image. It enables efficient reconstruction of JPEG images by using less computational resources in the low quality regions. Need for Region of Interest Decoding arises out of various other use cases such as
1. User might be interested in some portions of a JPEG image, hence it is a waste of computational resources to decode unwanted regions.
2. Display resolution of a display device may be much less than that of resolution of JPEG image. In such a case one has to either downscale the reconstructed image or one has to crop the reconstructed image. Hence, it is a waste of computational resources to decode unwanted regions and then either downscale/crop away the same.
3. Region of Interest decoding of Image Quality according to a particular use case; one being decode and display of approximations of a JPEG image.

Region specific information related to Region of Interest is passed on to all the threads/processes. Each thread/process decodes the Region of Interest according to the specified Region of Interest information. Region Specific Information can be
1. Image Quality to be reconstructed in a particular region. Image Quality to be reconstructed depends on number of Frequency Coefficients to be decoded, dynamic range of Frequency coefficients (minimum bits required to represent frequency coefficients) and re-quantization.
2. Coordinates of Region of Interest. Region of Interest may be specified in the form of rectangles. Coordinates are Starting Address of Region of Interest (e.g. extreme top-left corner of the rectangle), height and width of Region of Interest.
3. IDCT kernel to be used in a specific region.

Figure 8:
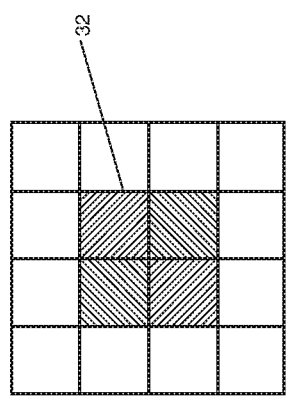
FIG. 8 shows an explicitly specified region of interest.

Objects of interests are generally centered in an image. Hence, the present disclosure chooses to divide image into an array of 4×4, as shown in FIG. 8. Outer regions are reconstructed with low image quality. The inner dark regions 32 are reconstructed with relatively higher image quality. Reconstruction of low quality regions can be done using less computation as compared to the high quality regions.

Low Image quality can be obtained in the following ways:
1. In low quality region IDCT kernel size is half in height and/or width to that of IDCT kernel size in high quality region.
2. Dynamic Range of frequency coefficients in low quality region is less as compared to Dynamic Range of frequency coefficients in high quality region.
3. Re-quantization—Quantization factors are increased and image is reconstructed in accordance with the increased quantization factors.

Instead of using default region of interest user can input regions of interest to JPEG decoder via "Mouse"/"Keyboard"/"touch screen". Regions of interest are reconstructed with higher image quality.

Many of the Use Cases for STB and DTV require Progressive JPEG Bitstream to be decoded in two ways, i.e.
1. Decoding a JPEG File in a single pass.
2. Decoding a Progressive JPEG Bitstream which is being streamed over a network.

Decoding of a Progressive JPEG image requires an intermediate buffer of certain size which could be as much as Bytes_per_DCT_Coeffcient×N×M×Number_of_Color_Components. In comparison, the present disclosure completely avoids usage of intermediate buffer and uses a small portion of output buffer as an intermediate buffer to store relatively small number of DCT coefficients.

Reconstruction of Sub-Sampled Approximations of a JPEG Image

Output buffer size can vary from "Pixel_depth_in_bytes×N×M×Number_of_Color_Components" to "Pixel_depth_in_bytes×(N×M+N×M×(Number_of_Color_Components−1)×¼)" depending on the output color format. Output color formats can be YUV 4:4:4, YUV 4:2:2, YUV 4:2:0, CMYK etc. Mostly YUV 4:4:4, YUV 4:2:2, YUV 4:2:0 are used by digital cameras and the content present on the internet is largely in these color formats. Pixel_depth_in_bytes can be 1 byte or 2 byte depending on whether input sample precision is 8 bpp (bits per pixel) or 12 bpp.

Sub-sampled reconstructed approximations of a JPEG image require an intermediate buffer which is at most $\frac{1}{4}^{th}$ the size of output buffer. Intermediate buffer required for storing frequency coefficients for decoding Sub-sampled approximations of a JPEG image varies from "Intermediate_sample_bit_depth_in_bytes×N×M×Number_of_Color_Components×¼" to "¼×Intermediate_sample_bit_depth_in_bytes×(N×M+N×M×(Number_of_Color_Components−1)×¼)" which is clearly less than the total output buffer memory available.

"Intermediate_sample_bit_depth_in_bytes" can be 1 byte or 2 bytes depending on the dynamic range of entropy decoded DCT coefficient.

In the worst case only $\frac{3}{4}^{th}$ ($\frac{1}{4}^{th}$ for storing the sub sampled reconstruction and ½ for storing the corresponding DCT coefficients) of the output buffer will be used for simultaneously storing frequency coefficients and reconstructed outputs. Worst case is defined as each frequency coefficient of each color component requiring 16 bits for storage and each reconstructed sample of each color component requiring 8 bits for storage. Hence sub-sampled approximations of a JPEG image can be reconstructed and sent to display without overwriting decoded frequency coefficients while $\frac{1}{4}^{th}$ of the output buffer memory is still available for decoding the progressive JPEG bitstream being received.

After sub-sampled approximations of a JPEG image have been reconstructed and sent to display, the next step is to reconstruct the final JPEG image to be sent to display.

Reconstruction of Complete JPEG Image

Final JPEG image is decoded efficiently in the following way; final JPEG image can be displayed in following ways:
1. Display of final image is not required until the complete image has been decoded.

For reconstruction of a final JPEG image a small buffer along with output buffer can be used to temporarily store the DCT coefficients of an Image component. Following is the sequence of operations which are performed for decoding a progressively encoded JPEG File.

1. At one time only one image component is decoded.
2. Depending on color format and other attributes of JPEG bitstream a decoding order of image components is decided such that this decoding order requires minimal amount of intermediate memory.
3. Decoding of next image component is started only after decoding of current image component is finished.
4. Entropy decode all scans of an image component. A small buffer along with output buffer is big enough to store all the required DCT coefficients of one image component even if most of the frequency coefficients require 16 bit. If required, all the techniques proposed in another invention disclosure titled as "A_Novel_Progressive_JPEG_Decode_Method" can be used to further reduce the memory required to store DCT coefficients.
5. Store Quantized Frequency Coefficients, i.e. Quantized DCT coefficients, in output buffer. Almost all quantized DCT coefficients of 8 bit sample precision can be stored in 8 bits due to quantization. If some frequency coefficients require 16 bits then same can be known by (i) input sample precision (ii) Quantization Table used for a particular component.
6. As an alternative to above step if enough memory is available to store each DCT coefficient in 16 bits then inverse quantized frequency coefficients are stored. This helps in reducing the repetitions of inverse quantization operations which otherwise would have to be done if quantized DCT coefficients are stored.
7. Defer performing rest of the decoding processes such as Inverse Quantization, IDCT, color format conversion etc until Quantized DCT coefficients from all scans of a particular image component become available.
8. Now decode each MCU/Data Unit of a segment of an image component and store the decoded MCU in Output buffer.

Instead of using an IDCT computation to upscale approximations of a JPEG image, one embodiment of the invention uses a software/hardware up-scaling operation. Such a division of work flow is efficient when a core operation inherently performs an up-scaling operation in addition to a data processing operation, such as decoding. Here, an up-scaling operation is performed by a separate module, hence the JPEG decoder requires less computation to decode progressive JPEG image, leading to a faster progressive JPEG decode in real time.

Figure 9:
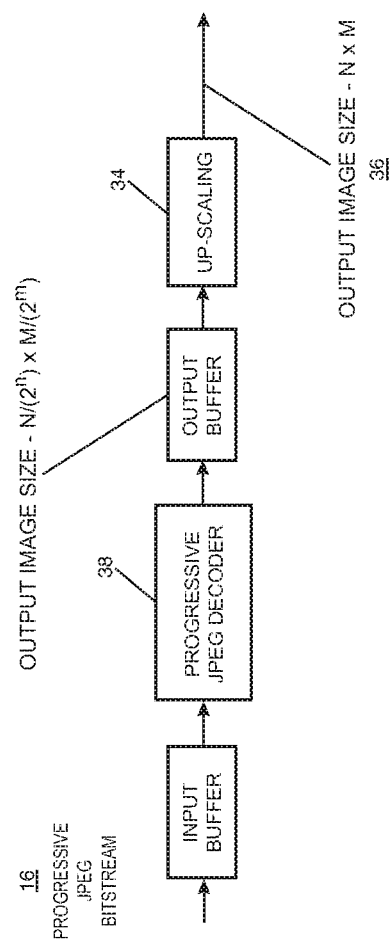
FIG. 9 shows image reconstruction using an up-scaling operation.

Sub-sampled approximations of a JPEG image can also be up-scaled by using software/hardware up-scaling operation 34 (see FIG. 9). A software up-scaling operation, if used, preferably runs on a separate processor. As shown in FIG. 9, a JPEG image of N×M size is reconstructed by using a subset of frequency coefficients. This division of the work flow is efficient when a core operation inherently performs the up-scaling operation 34 in addition to a data processing operation, such as decoding via prior art progressive JPEG decoder. In comparison up-scaling operation 34 is performed by a separate module; hence, the JPEG decoder 38 requires less computation to decode progressive JPEG image 36, resulting in a faster progressive JPEG decode in real time.

Optionally, image enhancement operations can be used prior to up-scaling or after scaling. These operations can be de-ringing, de-blocking, color correction, white balance, etc.

One present embodiment proposes to decode one Image Component in its entirety before it progresses to decode other Image components. The JPEG standard mandates that all AC DCT coefficients of an image component for a progressive JPEG image will be encoded in a non-interleaved mode, i.e. AC DCT coefficients of each image component shall be present as separate scans in a JPEG bitstream. For example, if N image components are present in a progressively encoded JPEG bitstream, one embodiment chooses to decode all DCT coefficients of one image component before it progresses to decode DCT coefficient of the next image component.

Strategy of decoding one image component at a time reduces the intermediate memory required to decode a progressively coded JPEG bitstream by a factor of N because only frequency coefficients, i.e. DCT coefficients of one component, have to be stored. Progressive Mode of JPEG allows only DC coefficients of all Image components to be encoded in interleaved mode. Storage of DC coefficients of other image components require typically (N−1)*W*H*2/64 bytes of memory. Numbers of image components in an image are usually in single digits. Since only one segment of an image component is decoded before proceeding to the next segment, the memory required to store DCT coefficients is proportional to the number of data units contained between 2 synchronization points.

If the system is decoding a JPEG bitstream contained in a file, then all scans of an image component are entropy decoded up to a synchronization point and are scheduled for the rest of the decoding processes, i.e., decoding processes which are performed after entropy decoding, once all quantized frequency/DCT coefficients of all the data units, of an image component between the two synchronization points become available. This helps in reducing the computation resources (IDCT, memory bandwidth, data copy, color format conversion, etc.) required to decode and display an image.

One embodiment of the present application proposes to decode a streaming progressive JPEG bitstream, which is being delivered over the internet, in the following ways:

In an all component sub-sampled progressive JPEG decode, sub-sampled approximations of JPEG image are decoded, reconstructed and sent for display. Sub-sampled approximations of JPEG image are decoded in a component wise manner, i.e., at a time single component is decoded and approximation of next component is scheduled for decoding only after approximation of previous component has been decoded. Sub-sampled approximation are upscaled 34. Once approximations of all image components become available they are then sent for display as an all component approximation of a JPEG image. After N/2×M/2 approximation of a JPEG image has been decoded and displayed, the next step is to decode and display complete N×M JPEG image 36. Decode of complete JPEG image is again performed in a component wise manner. An image component is scheduled for decoding in its entirety. Complete data units of current image component present between two synchronization points are scheduled for the rest of the decoding processes once all DCT coefficients of these MCU/data units of current image component become available. Decoding of the next image component is not started unless current image component has been decoded in its entirety. This process is repeated for the rest of the image components unless all image components are reconstructed. An image for display can be updated when next image component becomes available for display, i.e. all image components are displayed in succession one after the other, or all image components can be displayed at one time. As a result, user may experience a gradual build up of all component JPEG images, i.e., display of coarse approximation of an image followed by display of a final image.

In a single component sub-sampled progressive decode, DC coefficients of all image components are reconstructed and the image reconstructed using DC coefficients is sent to display. Luminance scans (if image was coded in YCbCr color format) are then scheduled for decoding and display. Sub-sampled approximations of Luminance component of JPEG image are then decoded 38, reconstructed and sent for display. The next step is to schedule Luminance image component for decoding in its entirety. Complete data units of current image component present between two synchronization points are scheduled for the rest of decoding processes once all DCT coefficients of these MCU/data units of current image component become available. Decoding of the next image component is not started unless current image component, i.e. all and complete MCU/data units of current image component, has been decoded in its entirety. This process is repeated for the rest of the image components unless all image components get reconstructed. The image can be updated when the next image component becomes available for display, i.e. all image components are displayed in succession one after the other, or all the image components are displayed at one time with the already displayed Luminance component. As a result user may experience a gradual build up of one component, i.e., Luminance component, as an approximation of a JPEG image followed by component by component build up of a JPEG image.

In a decode of a successive approximation encoded progressive bitstream, the most significant bits of the frequency coefficients are decoded in a component wise manner, i.e., at a time a single component is decoded and approximation of the next component is scheduled for decoding only after approximation of the previous component has been decoded. If memory is falling short during reconstruction of approximations of JPEG image, then reconstructing an image in multiple steps, i.e., reconstruction of available frequency coefficients of data units of current image component present between two synchronization points, is employed. Once approximations of all image components become available they are sent for display as an all component approximation of a JPEG image. After 4 to 5 MSB's of the frequency coefficients have been decoded and displayed for 8 bpp image, the next step is to decode and display all the bits of frequency coefficients of their complete N×M JPEG image 36. Decode of complete JPEG image is again performed in a component wise manner. An image component is scheduled for decoding in its entirety. Complete data units of current image component present between two synchronization points are scheduled for the rest of the decoding processes once all DCT coefficients of these MCU/data units of current image component become available. Decoding of the next image component is not started unless the current image component, i.e. all and complete MCU/data units of the current image component, has been decoded in its entirety. This process is repeated for the rest of the image components unless all image components are reconstructed. The image for display can be updated when the next image component becomes available for display, i.e. all image components are displayed in succession one after the other, or all image components can be displayed at once. As a result, user may experience a gradual build up of all component JPEG images, i.e., display of coarse approximation of an image followed by display of a final image.

In an all component progressive JPEC decode, available frequency coefficients which may be contained in multiple scans are decoded in a component wise manner, i.e., at a time a single component is decoded. Data units of a current image component present between two synchronization points are scheduled for the rest of the decoding processes once available DCT coefficients of these MCU/data units of the current image component become available. Decoding of the next image component is not started unless the current image component, i.e. all MCU/data units of the current image component, has been decoded in its entirety. This process is repeated for the rest of the image components unless approximations of all image components are reconstructed. Once approximations of all image components become available, they are then sent for display as an all component approximation of a JPEG image. After N/2×M/2 approximation of a JPEG image has been decoded and displayed, the next step is to decode and display the complete N×M JPEG image. Decode of complete JPEG image is again performed in a component wise manner. An image component is scheduled for decoding in its entirety. Complete data units of the current image component present between two synchronization points are scheduled for the rest of decoding processes once all DCT coefficients of these MCU/data units of current image component become available. Decoding of the next image component is not started unless the current image component has been decoded in its entirety. This process is repeated for the rest of the image components unless all image components are reconstructed. An image for display can be updated when the next image component becomes available for display, i.e. all image components are displayed in succession one after the other, or all image components can be displayed at once. As a result, user may experience a gradual build up of all component JPEG images, i.e., display of coarse approximation of an image followed by display of a final image.

As previously indicated, the prior art teaches reconstructing all the components of an image for every approximation of an image which is sent to display, and simultaneously stores the DCT coefficients of all the image components before starting the reconstruction of each MCU/data unit. In comparison, applicant reconstructs an image in the following ways:

1. Only DC coefficients of all components are reconstructed and an image so reconstructed is sent for display. Subsequently, the complete image is reconstructed and is sent for display
2. Only DC coefficients of all components are reconstructed, and an image thus reconstructed is sent for display. Subsequently only upgrades of a single component are reconstructed and sent for display, e.g., for Luminance. An image component is decoded in multiple MCU/data unit segments. Decoding of the next MCU/data unit segment of an image component is started only after DCT coefficients of the current MCU/data unit segment of an image component have been consumed. Decoding of the next image components is started only after DCT coefficients of a component of an image have been consumed. Memory which was used for storing DCT coefficients of MCU/data unit segments of a particular image component is re-used for storing DCT coefficients of other MCU/data unit segments of the current image component, and for memory which was used for storing DCT coefficients of a particular image component, a subset of that memory is re-used for storing DCT coefficients of another image component. A complete image can be sent to display in two ways. An image can be sent to display in a component wise manner. An image component is sent for display once it has been decoded. This process is repeated until all image components of an image have been decoded and have been sent for display, or a complete image can be sent to display in one shot.

3. Only DC coefficients of all components are reconstructed, and an image thus reconstructed is sent for display. Subsequently, upgrades of image components are reconstructed in a component wise manner, i.e. one component at a time. An image component is decoded in multiple MCU/data unit segments. Decoding of the next MCU/data unit segment of an image component is started only after available/chosen DCT coefficients of the current MCU/data unit segment of an image component have been consumed. Decoding of the next image components is started only after available/chosen DCT coefficients of a component of an image have been consumed. Memory which was used for storing DCT coefficients of MCU/data unit segments of a particular image component is re-used for storing DCT coefficients of other MCU/data unit segments of the current image component. All components are simultaneously sent for display. Improvements in JPEG image are decoded only up to half the height and width of output image size, which is obtained by decoding the frequency coefficients that correspond to half the height and width of a data unit block. After this the complete JPEG image is reconstructed in its entirety before any further updates can be sent to display. Decoding is again done in a component wise manner. An image component is decoded in multiple MCU/data unit segments. Decoding of the next MCU/data unit segment of an image component is started only after all the DCT coefficients of the current MCU/data unit segment of an image component have been consumed. Memory which was used for storing DCT coefficients of MCU/data unit segments of a particular image component is re-used for storing DCT coefficients of other MCU/data unit segments of the current image component, and for memory which was used for storing DCT coefficients of a particular image component, a subset of that memory is re-used for storing DCT coefficients of another image component. A complete image can be sent to display in two ways. An image can be sent to display in a component wise manner. An image component is sent for display once it has been decoded. This process is repeated until all image components of an image have been decoded and have been sent for display, or a complete image, i.e. all image components, can be simultaneously sent for display.

4. Only DC coefficients of all components are reconstructed and an image thus reconstructed is sent for display. Subsequently, upgrades of image components are reconstructed in a component wise manner, i.e. one component at a time. An image component is decoded in multiple MCU/data unit segments. Decoding of the next MCU/data unit segment of an image component is started only after available/chosen bits of available/chosen DCT coefficients of the current MCU/data unit segment of an image component have been consumed. Decoding of the next image components is started only after available/chosen bits of available/chosen DCT coefficients of a component of an image have been consumed. Memory which was used for storing DCT coefficients of MCU/data unit segments of a particular image component is re-used for storing DCT coefficients of other MCU/data unit segments of the current image component. All components are simultaneously sent for display. Improvements in JPEG image are decoded only up to 4 or 5 MSB's of frequency coefficients. After this, the complete JPEG image is reconstructed in its entirety before any further updates can be sent to display. Decoding is again done in a component wise manner. An image component is decoded in multiple MCU/data unit segments. Decoding of the next MCU/data unit segment of an image component is started only after all the DCT coefficients of current MCU/data unit segment of an image component have been consumed. Memory which was used for storing DCT coefficients of MCU/data unit segments of a particular image component is re-used for storing DCT coefficients of other MCU/data unit segments of the current image component. With memory which was used for storing DCT coefficients of a particular image component, a subset of that memory is re-used for storing DCT coefficients of another image component. The complete image can be sent to display in two ways. An image can be sent to display in a component wise manner. An image component is sent for display once it has been decoded. This process is repeated until all image components of an image have been decoded and have been sent for display, or a complete image, i.e. all image components, can be simultaneously sent for display.

The prior art sequentially decodes various scans of an image component. A second scan is scheduled for entropy decoding only after a first scan has been entropy decoded. In comparison, pursuant to the present disclosure, parallel decoding of more than one scan of an image component is performed.

A JPEG bitstream encoded using successive approximation requires certain information of previous scan to decode current scan. Entropy decode of a data unit of a current scan doesn't proceed unless information of this data unit from the previous scan becomes available.

A Parallel Entropy Decoder can run on one or more multiple hardware/programmable processor cores.

Pursuant to one efficient embodiment of the present application, approximations of a JPEG image are reconstructed by storing the frequency coefficients so that entropy decode and inverse transform operations don't have to be repeated for every approximate reconstruction of a JPEG image.

The prior art uses separate buffers for storing DCT coefficients and output of JPEG decoder. In comparison, the present disclosure uses an output buffer for temporarily storing DCT coefficients and hence uses a smaller intermediate buffer than does the prior art. The size of the intermediate buffer used is dependent on the color format. An intermediate buffer of smaller size is used for YCbCr 4:2:0 as compared to YCbCr 4:4:4. Depending on the application, the intermediate buffer can range from memory required to store frequency coefficients of 1 MCU/data unit to few rows of frequency coefficients of MCU/data unit.

Whereas the prior art uses the same decoding order of the image components, the present disclosure can alter the decoding order of image components to reduce the memory requirement for storing DCT coefficients.

Pursuant to the present application, the intermediate memory required for decoding a progressively encoded JPEG bitstream by a considerable amount. Simultaneously, the computation resources required to decode a progressively encoded image (JPEG/JPEG-XR) bitstream is reduced since repeated IDCT, data copy and color format conversion may not be required. The performance efficiency is increased in terms of real time performance and power consumed for decoding a progressively encoded JPEG bitstream is reduced.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations; rather, the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus are described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of processing a progressive image bitstream, the method comprising:
   determining whether a data unit segment of an image is in a user-specified region of interest;
   successively scanning the data unit segment of the image in the progressive image bitstream to produce two or more scans;
   decoding, in parallel, the two or more scans of the data unit segments; and
   reconstructing the data unit segment according to the two or more decoded scans of the data unit segment, wherein the data unit segment is reconstructed with a higher image quality if the data unit segment is in the user-specified region of interest.

2. The method of claim 1, wherein decoding comprises utilizing multiple entropy decoders.

3. The method of claim 1, wherein the data unit segment is between two synchronization points.

4. The method of claim 1, wherein decoding comprises temporarily storing a discrete cosine transform (DCT) coefficient of the data unit segment in an output image buffer.

5. The method of claim 1, wherein the data unit segment comprises $\frac{1}{4}^{th}$ of frequency coefficients that are present in a top-left 4×4 array of an 8×8 a data unit block.

6. The method of claim 1, wherein the data unit segment comprises an approximation of at least one image component using stored DCT coefficients.

7. The method of claim 1, wherein the method comprises up-scaling reconstructed sub-sampled approximations of the data unit segment.

8. A system for processing a progressive image bitstream comprising:
   a user interface operable to identify whether a data unit segment of an image is in a region of interest;
   a scanner operable to successively scan a data unit segments of an image in the progressive image bitstream to produce two or more scans;
   two or more decoders operable in parallel to decode the two or more scans of the data unit segment; and a circuit operable to reconstruct the data unit segment according to the two or more decoded scans of the data unit segment, wherein the data unit segment is reconstructed with a higher image quality if the data unit segment is in the region of interest.

9. The system of claim 8, wherein the two or more decoders are two or more entropy decoders.

10. The system of claim 8, wherein the data unit segment is between two synchronization points.

11. The system of claim 8, wherein the system comprises an output image buffer operable to temporarily store a discrete cosine transform (DCT) of the data unit segment.

12. The system of claim 8, wherein the data unit segment comprises $\frac{1}{4}^{th}$ of frequency coefficients that are present in a top-left 4×4 array of an 8×8 a data unit block.

13. The system of claim 8, wherein the data unit segment comprises an approximation of at least one image component using stored DCT coefficients.

14. The system of claim 8, wherein the circuit is operable to up-scale reconstructed sub-sampled approximations of the data unit segment.

15. The non-transitory computer-executable storage medium of claim 8, wherein the parallel decoding comprises entropy decoding.

16. A non-transitory computer-executable storage medium comprising program instructions which are computer-executable to implement:

program instructions that receive an input from a user interface to identify whether a data unit segment of an image is in a region of interest;

program instructions that cause a production of two or more scans of a data unit segment, the data unit segment being an element of an image in a progressive image bitstream;

program instructions that cause a parallel decoding of the two or more scans of the data unit segment; and program instructions that cause a reconstruction of the data unit segment according to the two or more decoded scans of the data unit segment, wherein the data unit segment is reconstructed with a higher image quality if the data unit segment is in the region of interest.

17. The non-transitory computer-executable storage medium of claim 16, wherein the data unit segment is between two synchronization points.

18. The non-transitory computer-executable storage medium of claim 16, wherein the program instructions cause a discrete cosine transform (DCT) of the data unit segment to be temporarily stored in an output image buffer.

19. The non-transitory computer-executable storage medium of claim 16, wherein the data unit segment comprises $\frac{1}{4}^{th}$ of frequency coefficients that are present in a top-left 4×4 array of an 8×8 a data unit block.

20. The non-transitory computer-executable storage medium of claim 16, wherein the data unit segment comprises an approximation of at least one image component using stored DCT coefficients.

21. The non-transitory computer-executable storage medium of claim 16, wherein the program instructions cause a reconstructed sub-sampled approximations of the data unit segment to be up-scaled.

* * * * *